United States Patent [19]

Nakanishi

[11] Patent Number: 5,151,833
[45] Date of Patent: Sep. 29, 1992

[54] MAGNETIC TAPE DEVICE HAVING A SWITCHING MECHANISM FOR DIVERTING ROTATION OF THE CAPSTAN TO ROTATION FOR LOADING/UNLOADING A CASSETTE IN THE DEVICE

[75] Inventor: Yasuyuki Nakanishi, Hyogo, Japan

[73] Assignee: Mitsubishi Denki Kabushiki Kaisha, Tokyo, Japan

[21] Appl. No.: 579,972

[22] Filed: Sep. 10, 1990

[30] Foreign Application Priority Data

Sep. 12, 1989 [JP] Japan ................................. 1-234745
Sep. 13, 1989 [JP] Japan ................................. 1-235815
Sep. 19, 1989 [JP] Japan ................................. 1-240553

[51] Int. Cl.⁵ ............................................. G11B 5/027
[52] U.S. Cl. ........................................... 360/85; 360/95
[58] Field of Search ........................ 360/85, 95, 96.5

[56] References Cited

U.S. PATENT DOCUMENTS 4,704,643 11/1987 Matsuoka ............................. 360/71
4,781,339 11/1988 Ahn ................................. 360/96.5 X
4,796,116 1/1989 Kwon ................................. 360/85

FOREIGN PATENT DOCUMENTS 3838013 5/1989 Fed. Rep. of Germany .
63-213152 9/1988 Japan .

Primary Examiner—A. J. Heinz
Attorney, Agent, or Firm—Burns, Doane, Swecker & Mathis

[57] ABSTRACT

A magnetic tape device which includes a minimized number of motors and can be produced in a reduced size at a reduced cost. The magnetic tape device comprises a capstan motor having a motor shaft operatively connected to a capstan, a motor gear securely mounted on the motor shaft, a cam gear operatively connected to a drive motor to operate a tape loading mechanism, a moving gear for engaging with the motor gear to transmit rotation of the motor shaft of the capstan motor to a cassette loading mechanism, and a first pivotal lever supported for rotation around a fixed axis and having the moving gear mounted for rotation thereon. The lever is operatively associated with the cam gear such that, when the tape loading mechanism is in an inoperative position, the moving gear meshes with the motor gear to transmit rotation of the motor shaft to the cassette loading mechanism, but when the tape loading mechanism is moved to an operative position, the moving gear is brought out of meshing engagement with the motor gear.

9 Claims, 10 Drawing Sheets

MAGNETIC TAPE DEVICE HAVING A SWITCHING MECHANISM FOR DIVERTING ROTATION OF THE CAPSTAN TO ROTATION FOR LOADING/UNLOADING A CASSETTE IN THE DEVICE

BACKGROUND OF THE INVENTION

1. Field of the Invention

This invention relates to a magnetic tape device which includes a cassette loading mechanism, a tape loading mechanism and a tape feeding mechanism.

2. Description of the Prior Art

Magnetic tape devices which include a cassette loading mechanism, a tape loading mechanism and a tape feeding mechanism are already known. Part of a mechanism of an exemplary one of such conventional magnetic tape devices is shown in FIGS. 9 and 10. Referring to FIGS. 9 and 10, the mechanism shown is a mechanism of a digital audio tape recorder and includes a capstan motor 1 mounted on an upper face, that is, on the rear face side of FIG. 4, of a deck base 7. The capstan motor 1 has a motor shaft 2 on which a pulley 3 is securely mounted. A flywheel 4 is mounted for rotation on a lower face of the deck base 7, and a capstan 5 extends upwardly, that is, in a direction to the rear face side of FIG. 4, from the flywheel 4. A belt 6 extends between and around the flywheel 4 and the pulley 3.

A power motor 10 is mounted on the upper face of the deck base 7 and has a motor shaft 11 on which an output gear 12 is securely mounted.

A cam gear 20 is mounted for rotation around a first post 21 on the lower face of the deck base 7 and has first and second cam grooves 22 and 23 formed thereon. A first lever 24 is mounted for pivotal motion around a first support shaft 25, and a first pin 26 is mounted at an end of the first lever 24 and fitted in the first cam groove 22 of the cam gear 20. A first engaging pin 27 is mounted at the other end of the first lever 24.

A second lever 30 is mounted for pivotal motion around a second support shaft 31 on the lower face of the deck base 7, and a second pin 32 is mounted at an intermediate portion of the second lever 30 and fitted in the second cam groove 23 of the cam gear 22. A second engaging pin 33 is mounted at an end of the second lever 30 and fitted in an engaging hole 35 formed at an end portion of a movable plate 34. A guide groove 36 is formed at an intermediate portion of the movable plate 34, and a guide pin 37 is mounted on the lower face of the deck base 7 and fitted in the guide groove 36 to guide the movable plate 34 for movement in a direction indicated by an arrow mark B in FIG. 9.

In operation, when the power motor 10 is energized, the motor shaft 11 and output gear 12 are rotated, and torque of rotation of the output gear 12 is transmitted to a cassette loading mechanism not shown to move a cassette holder not shown from a cassette receiving position to a cassette playing position along an L-shaped locus not shown to set a tape cassette in its playing position in which a pair of reel receiving elements are fitted in reel holes formed in the tape cassette.

Meanwhile, when a further drive motor not shown is energized, the cam gear 20 is rotated in the direction indicated by an arrow mark A in FIG. 9. Upon such rotation of the cam gear 20, the first pin 26 on the first lever 24 is moved in and along the first cam groove 22 of the cam gear 20 to pivot the first lever 24 in the clockwise direction in FIG. 9 around the first support shaft 25. As a result, the reel receiving elements are braked under suitable control by a reel braking mechanism not shown which is operatively connected to the first engaging pin 27 of the first lever 24. Meanwhile, upon rotation of the cam gear 20 in the direction indicated by the arrow mark A, the second pin 32 of the second lever 30 is moved in and along the second cam groove 23 of the cam gear 20 to pivot the second lever 30 in the counterclockwise direction around the second support shaft 31. As a result, the movable plate 34 is moved in the direction indicated by the arrow mark B, and a magnetic tape in the tape cassette is drawn out by way of a tape loading mechanism not shown toward a rotary drum not shown which is provided to read or write information from or onto the magnetic tape loaded in position around the rotary drum.

On the other hand, when the capstan motor 1 is energized, the capstan 5 is rotated by way of the motor shaft 2, pulley 3, belt 6 and flywheel 4, and as a result, the magnetic tape is fed by way of the tape feeding mechanism while it is held in contact with the rotary drum.

With the conventional digital audio tape recorder, the power motor 10 is used as an operation driving source for the cassette loading mechanism for moving the cassette holder and a cassette on the cassette holder between the cassette receiving position and the cassette playing position while the capstan motor 1 is used as an operation driving source for the tape feeding mechanism for feeding a tape. Thus, different motors are employed individually for exclusive use. If one of the motors is eliminated, a spacing to be occupied by such motor is eliminated, and consequently, miniaturization of a magnetic tape device can be achieved and the production cost can be reduced as much.

SUMMARY OF THE INVENTION

It is an object of the present invention to provide a magnetic tape device which includes a reasonable number of motors and can be produced in a reduced size at a reduced cost.

In order to attain the object, according to the present invention, there is provided a magnetic tape device which includes a cassette loading mechanism for moving a tape cassette between a cassette receiving position and a cassette playing position, a tape feeding mechanism including a capstan for feeding a magnetic tape in the tape cassette in the cassette playing position, a rotary drum for guiding the magnetic tape being fed, a tape loading mechanism for drawing out the magnetic tape from the cassette in the cassette playing position toward the rotary drum, and a drive motor for driving the tape loading mechanism, comprising a capstan motor having a motor shaft operatively connected to the capstan, a motor gear securely mounted on the motor shaft of the capstan motor, a cam gear operatively connected to the drive motor to operate the tape loading mechanism, a moving gear for engaging with the motor gear to transmit rotation of the motor shaft of the capstan motor to the cassette loading mechanism, and a first pivotal level supported for rotation around a fixed axis and having the moving gear mounted for rotation thereon, the lever being operatively associated with the cam gear such that, when the tape loading mechansim is in an inoperative position, the moving gear meshes with the motor gear to transmit rotation of the motor shaft of the capstan motor to the cassette loading mechanism, but when the tape loading mechanism is moved to an operative position, the moving gear is brought out of meshing engagement with the motor gear.

With the magnetic tape device, since rotation of the capstan motor is transmitted not only to the tape feeding mechanism but also to the cassette loading mechansim by way of the moving gear when the moving gear remains in meshing engagement with the motor gear, the single motor is used commonly to drive the two loading mechanisms, and a motor for the exclusive use for the cassette loading mechanism is eliminated. Consequently, the magnetic tape device can be produced in a reduced size at a reduced cost.

Preferably, the magnetic tape device further comprises an output gear supported for rotation around the fixed axis of the first pivotal lever and held in meshing engagement with the moving gear so that rotation of the moving gear is transmitted to the cassette loading mechanism by way of the output gear. Since the output gear is rotated around the fixed axis, rotation of the moving gear can be transmitted to the cassette loading mechanism readily with a simple construction.

The magnetic tape device may further comprise a second pivotal lever supported for pivotal motion around another fixed axis and normally held in operative connection with the cam gear, and engaging means for normally engaging the first pivotal lever with the second pivotal lever. Thus, when the tape loading mechanism is rendered operative, the moving mechanism is disengaged with certainty from the motor gear and consequently the cassette loading mechanism is kept inoperative. Accordingly, a possible trouble which may be caused by simultaneous operation of the tape loading mechanism and the cassette loading mechanism is prevented effectively.

Preferably, the engaging means is constituted such that the first pivotal lever is capable of being disengaged from the second pivotal lever when the second pivotal lever is pivoted by the cam gear until the tape loading mechanism is moved to the operative position. Particularly, the engaging means may include a pin mounted on one of the first and second pivotal levers, and a hook formed on the other of the first and second pivotal levers and defining a groove in which the pin is removably fitted. The first pivotal lever is thus pivoted to positively disengage the moving gear from the motor gear when the take loading mechanism is rendered operative.

Preferably, the magnetic tape device further comprises means responsive to movement of the tape loading mechanism from the inoperative to the operative position for positively pivoting the first pivotal lever to disengage the moving gear from the motor gear. Thus, when the the tape loading mechanism is moved from the inoperative to the operative position, the first pivotal lever is pivoted to positively disengage the moving gear from the motor gear.

The above and other objects, features and advantages of the present invention will become apparent from the following description and the appended claims, taken in conjunction with the accompanying drawings in which like parts are denoted by like reference characters all through the drawings.

DESCRIPTION OF THE PREFERRED EMBODIMENTS

Figure 1:
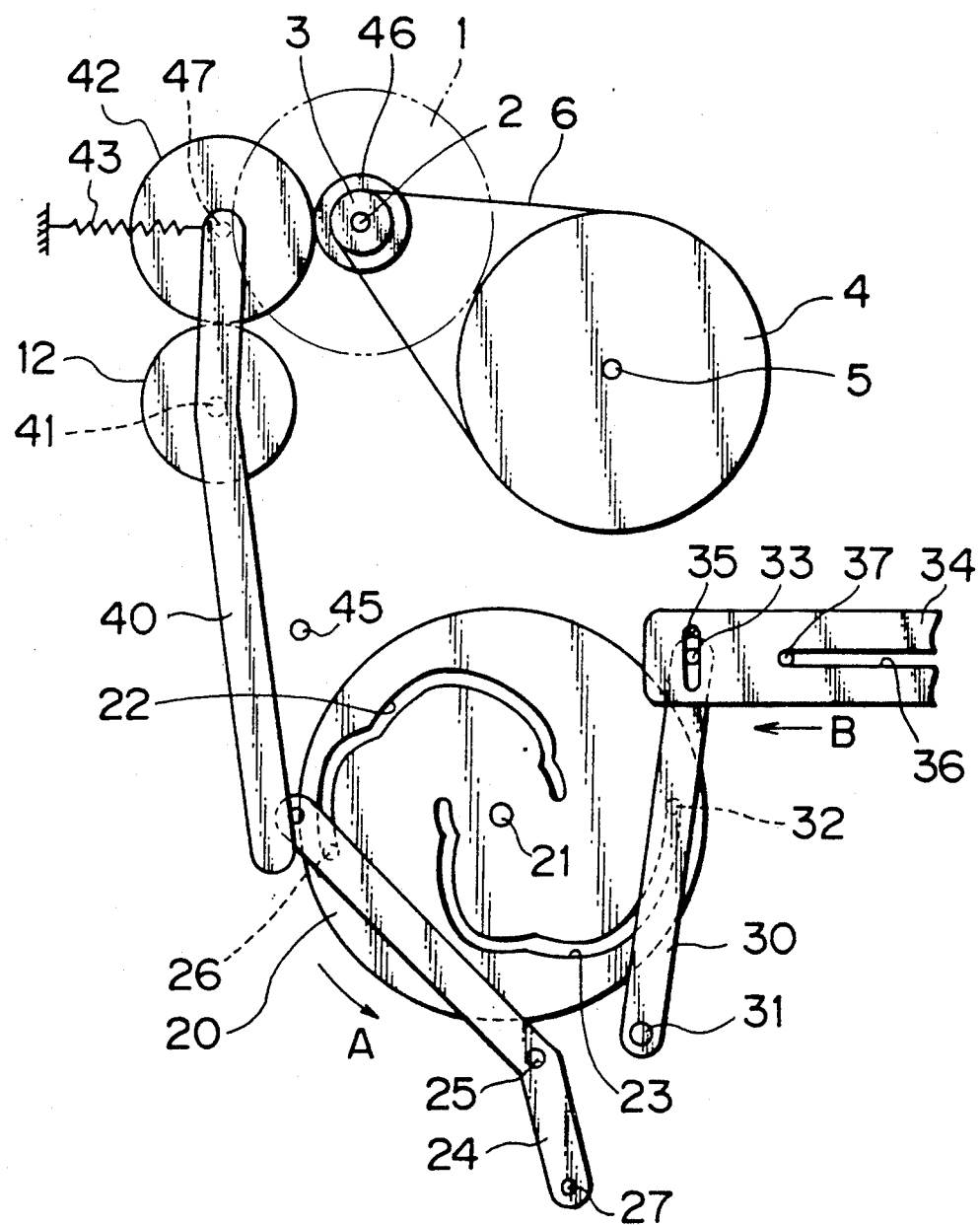
FIG. 1 is a bottom plan view of part of a mechanism of a digital audio tape recorder showing a preferred embodiment of the present invention.
Figure 2:
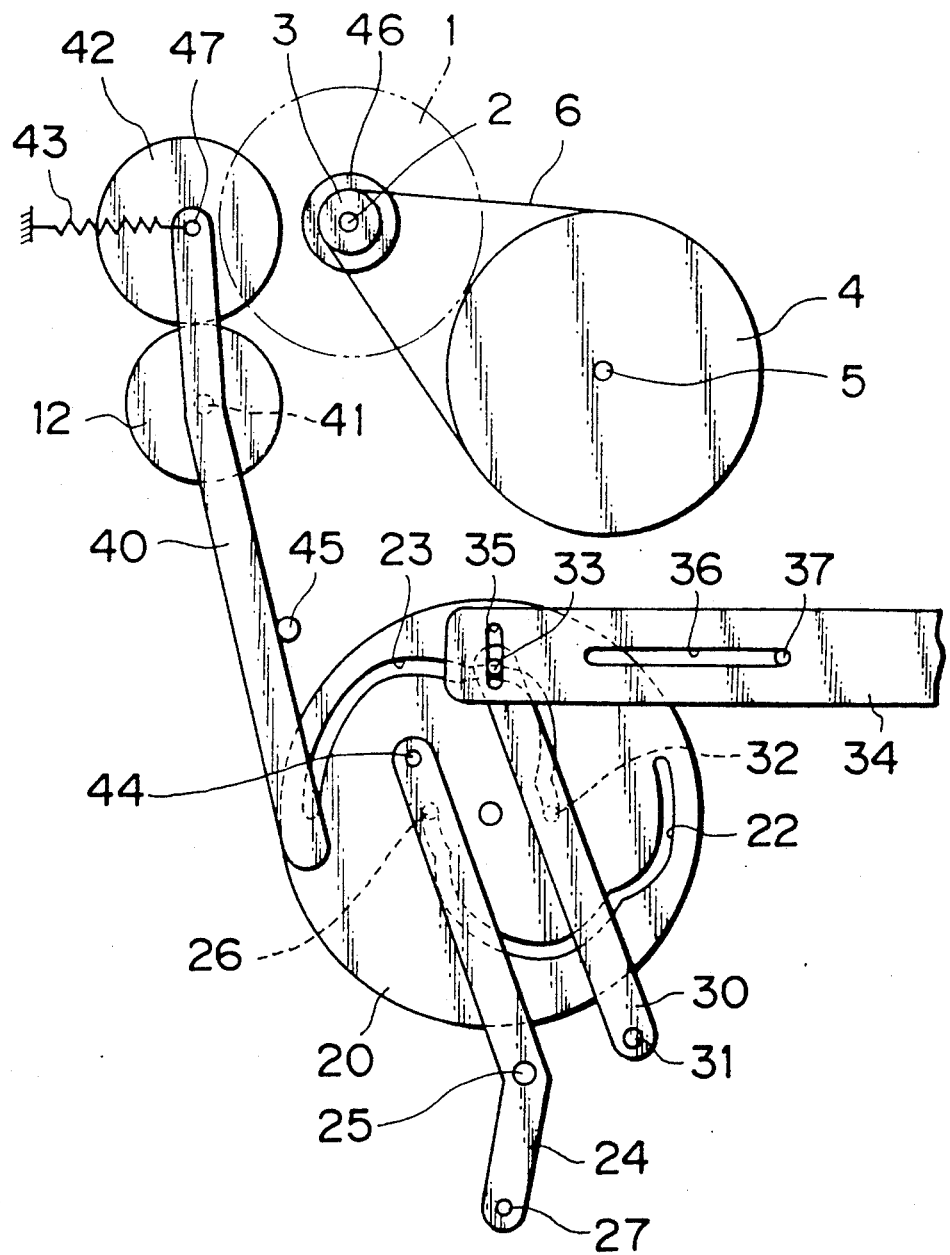
FIG. 2 is a similar view but showing the mechanism of FIG. 1 in a different position.
Figure 3:
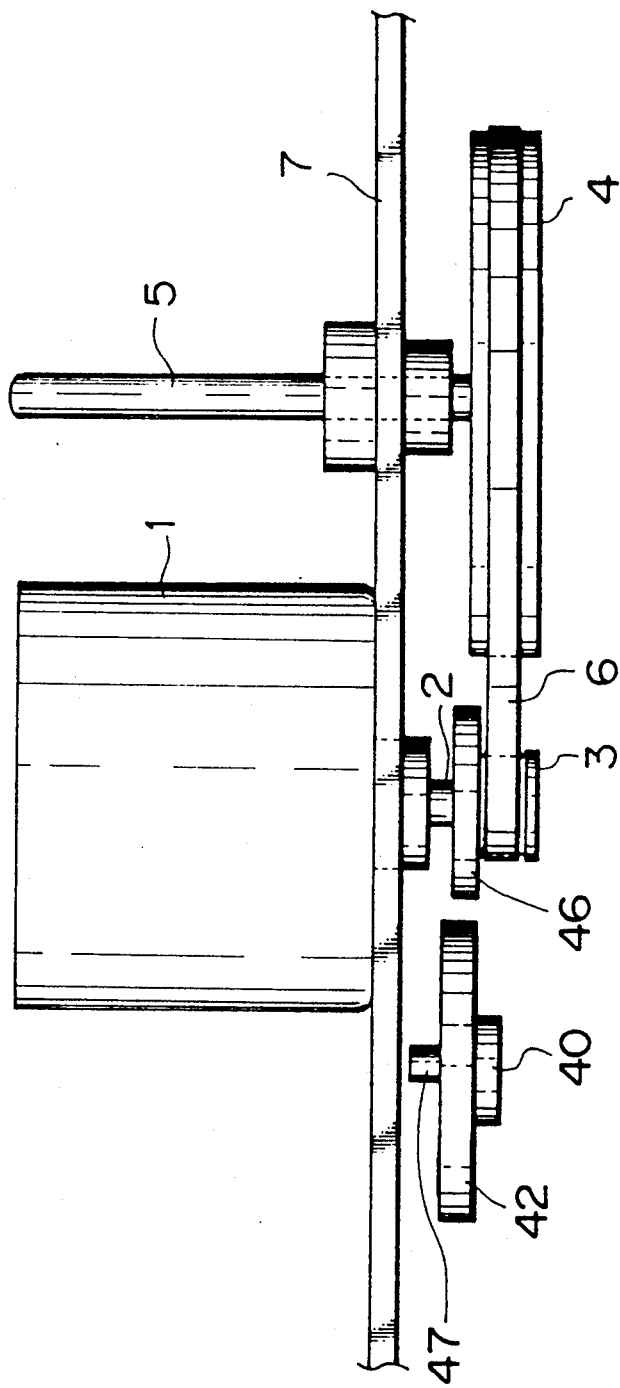
FIG. 3 is a side elevational view showing, in an enlarged scale, the digital audio tape recorder of FIG. 2.

Referring first to FIGS. 1 to 3, there is shown part of a mechanism of a digital audio tape recorder to which the present invention is applied. The digital audio tape recorder employs the mechanism of the conventional magnetic tape device described hereinabove with reference to FIGS. 9 and 10, and description of the common construction is omitted herein to avoid redundancy.

The digital audio tape recorder mechanism does not include such power motor 10 as in the conventional magnetic tape device shown in FIGS. 9 and 10, and the output gear 12 is securely mounted not on such motor shaft 11 of the power motor 10 as described hereinabove but on a third support shaft 41 mounted on the deck base 7. A third lever 40 is mounted at an intermediate portion thereof for pivotal motion around the third support shaft 41 on the rear face of the deck base 7. A moving gear 42 is mounted for rotation around a post 47 at an end of the third lever 40, and a motor gear 46 is securely mounted on the motor shaft 2 for engaging with the moving gear 42. A spring 43 is connected at an end thereof to the post 47 and at the other end thereof to the deck base 7 and normally urges the third lever 40 in the counterclockwise direction in FIG. 1. A contacting pin 44 is mounted at an end portion of the first lever 24 remote from the first engaging pin 27 farther than the first pin 26 for contacting with another end portion of the third lever 40 remote from the post 47. A stopper pin 45 is mounted on the rear face of the deck base 7 for contacting with a side edge of the third lever 40 to prevent the third lever 40 from being pivoted in the counterclockwise direction farther than such a predetermined angular position as shown in FIG. 2.

In the digital audio tape recorder, when the capstan motor 1 is energized, the output gear 12 is rotated by way of the motor gear 46 and moving gear 42 by the capstan motor 1, and torque of rotation of the output gear 12 is transmitted to the cassette loading mechanism to move the cassette holder and a tape cassette not shown from the cassette receiving position to the cassette playing position along the L-shaped locus not shown to set the tape cassette in the cassette playing position in which the reel holes of the tape cassette are fitted on the reel receiving elements.

After the tape cassette has been set in position in this manner, the drive motor not shown is energized to rotate the cam gear 20 in the counterclockwise direction indicated by an arrow mark A in FIG. 1. During such rotation of the cam gear 20, the first pin 26 on the first lever 24 is moved in and along the first cam groove 22 of the cam gear 20 so that the first lever 24 is pivoted in the clockwise direction around the first support shaft 25. Upon such pivotal motion of the first lever 24, the third lever 40 is pivoted in the counterclockwise direction around the third support shaft 41 by the urging force of the spring 43 following the contacting pin 44 on the first lever 24 to disengage the moving gear 42 from the motor gear 46. Further, during counterclockwise rotation of the cam gear 20, the second pin 32 on the second lever 30 is moved in and along the second cam groove 23 of the cam gear 20 so that the second lever 30 is pivoted in the counterclockwise direction in FIG. 1 around the second support shaft 31. As a result, the movable plate 34 is moved in the direction indicated by an arrow mark B. Thereupon, the tape loading mechanism is operated to draw out a magnetic tape not shown from within the tape cassette and introduce the magnetic tape toward the rotary drum which is provided to read or write information from or onto the magnetic tape.

Figure 9:
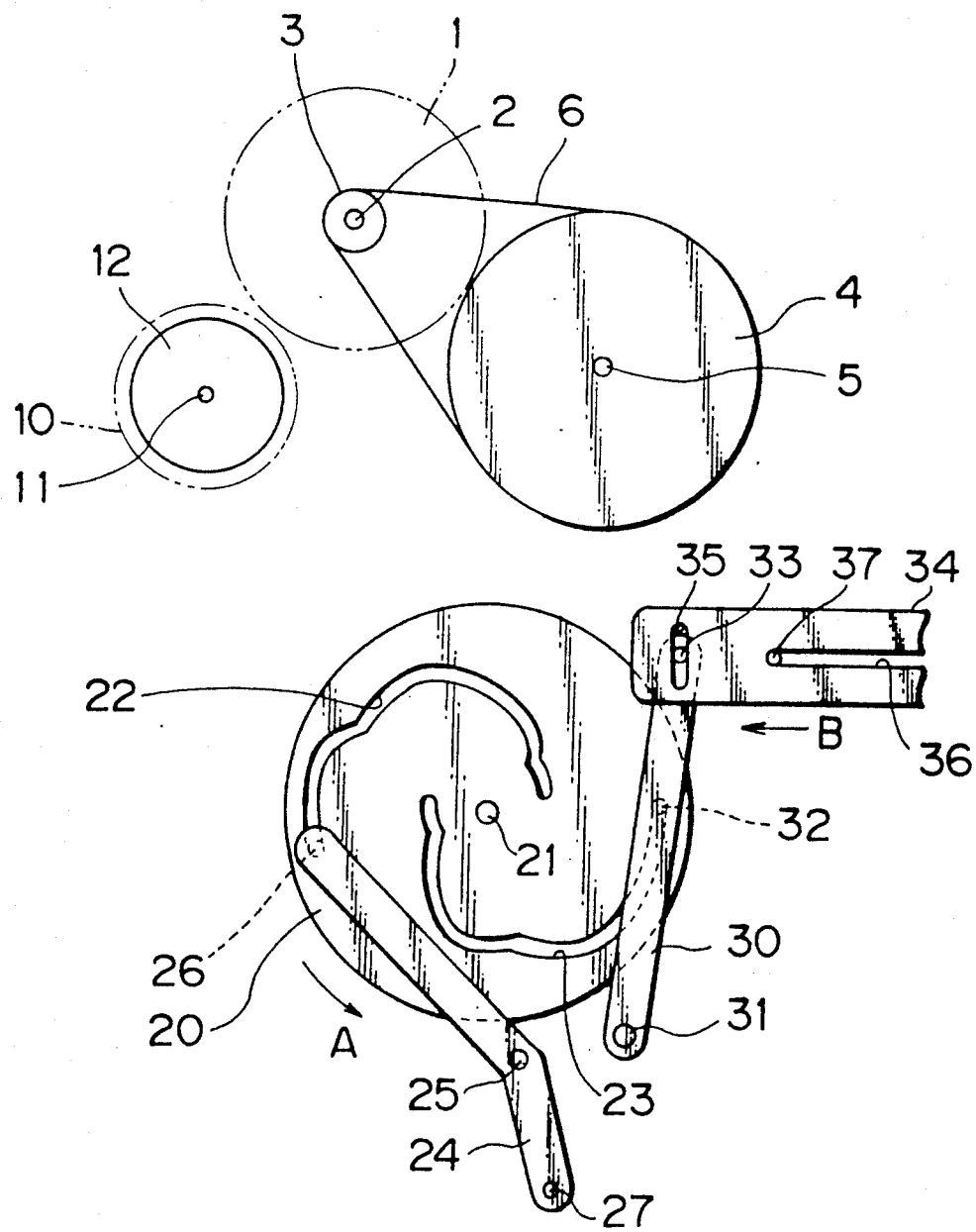
FIG. 9 is a bottom plan view of part of a mechanism of a conventional magnetic tape device.
Figure 10:
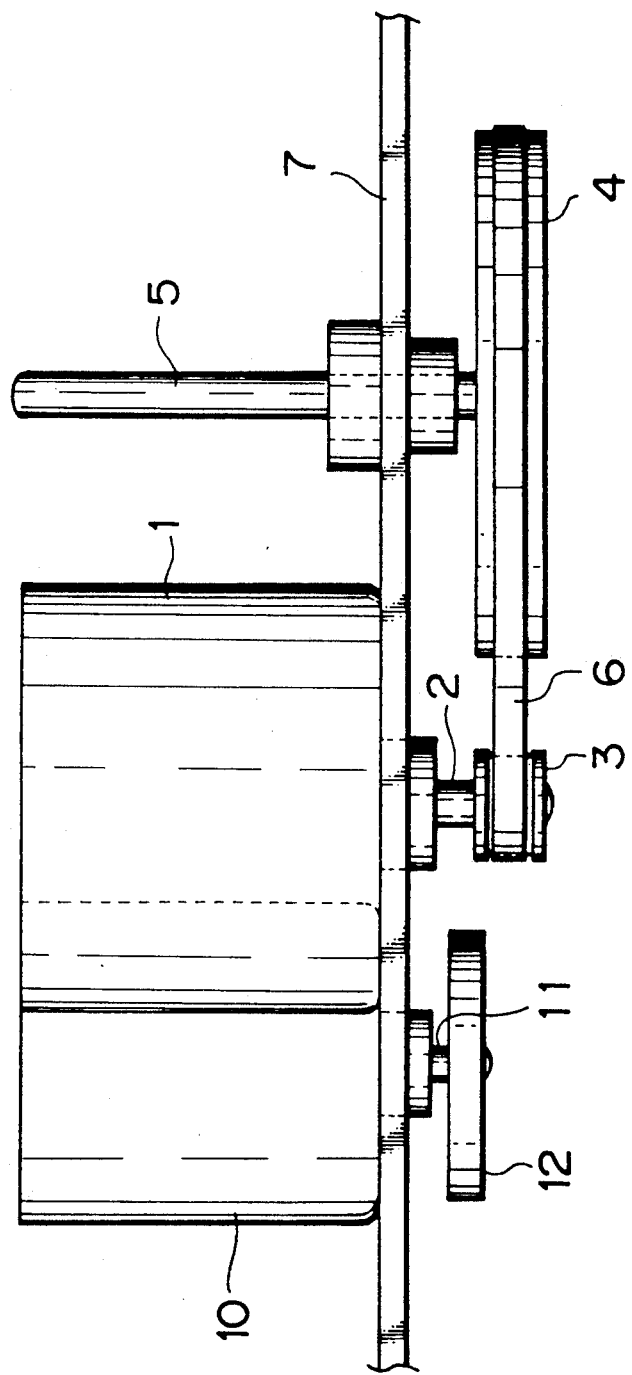
FIG. 10 is a side elevational view showing the mechanism of FIG. 9 in an enlarged scale.

With the digital audio tape recorder described above, the power motor 10 of the conventional magnetic tape device shown in FIGS. 9 and 10 is omitted while rotation of the capstan motor 1 is transmitted commonly to the tape feeding mechanism and the cassette loading mechanism. Consequently, the digital audio tape recorder requires a reduced spacing and can be produced at a reduced production cost.

Figure 4:
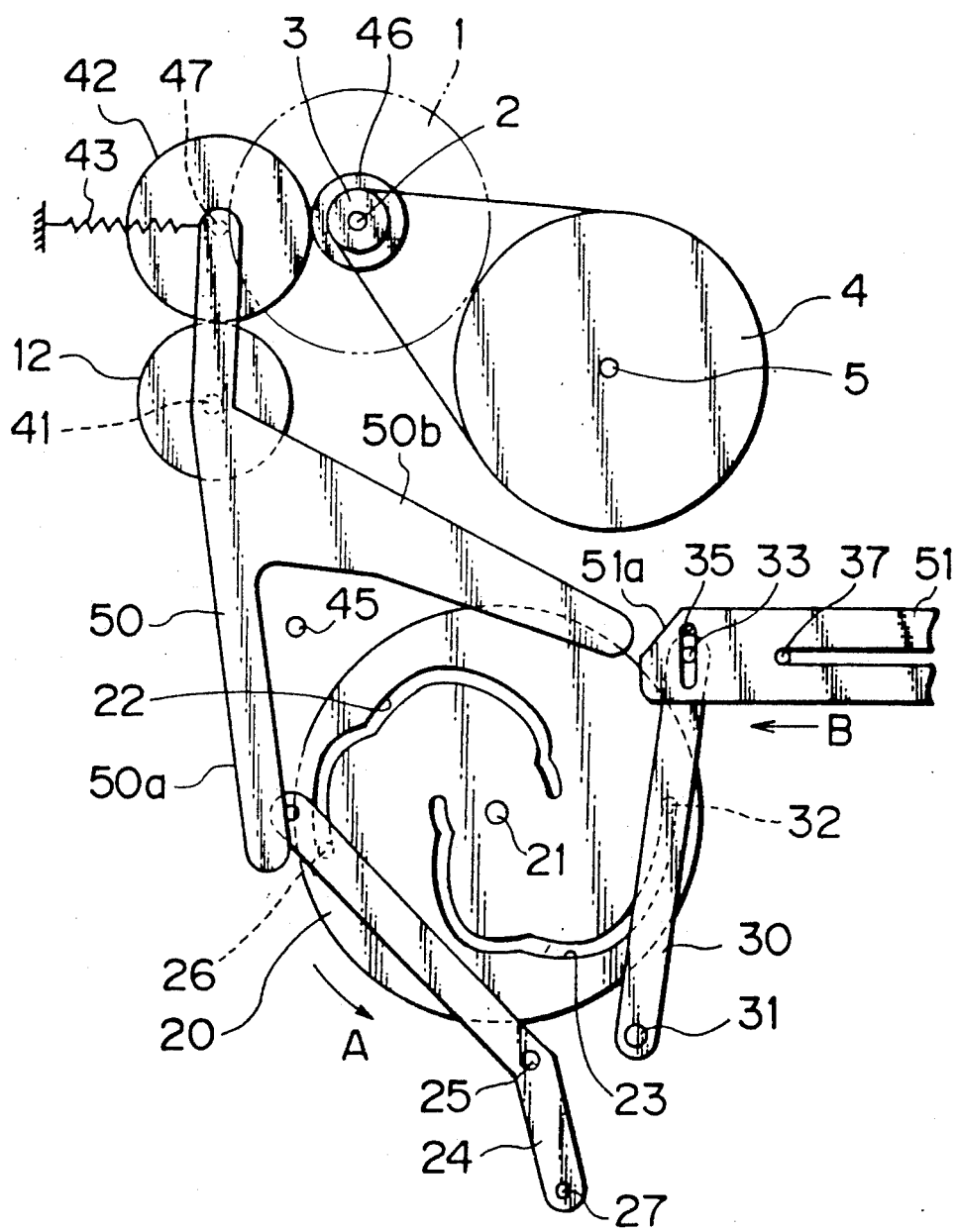
FIG. 4 is a bottom plan view of part of a mechanism of a digital audio tape recorder showing a second preferred embodiment of the present invention.
Figure 5:
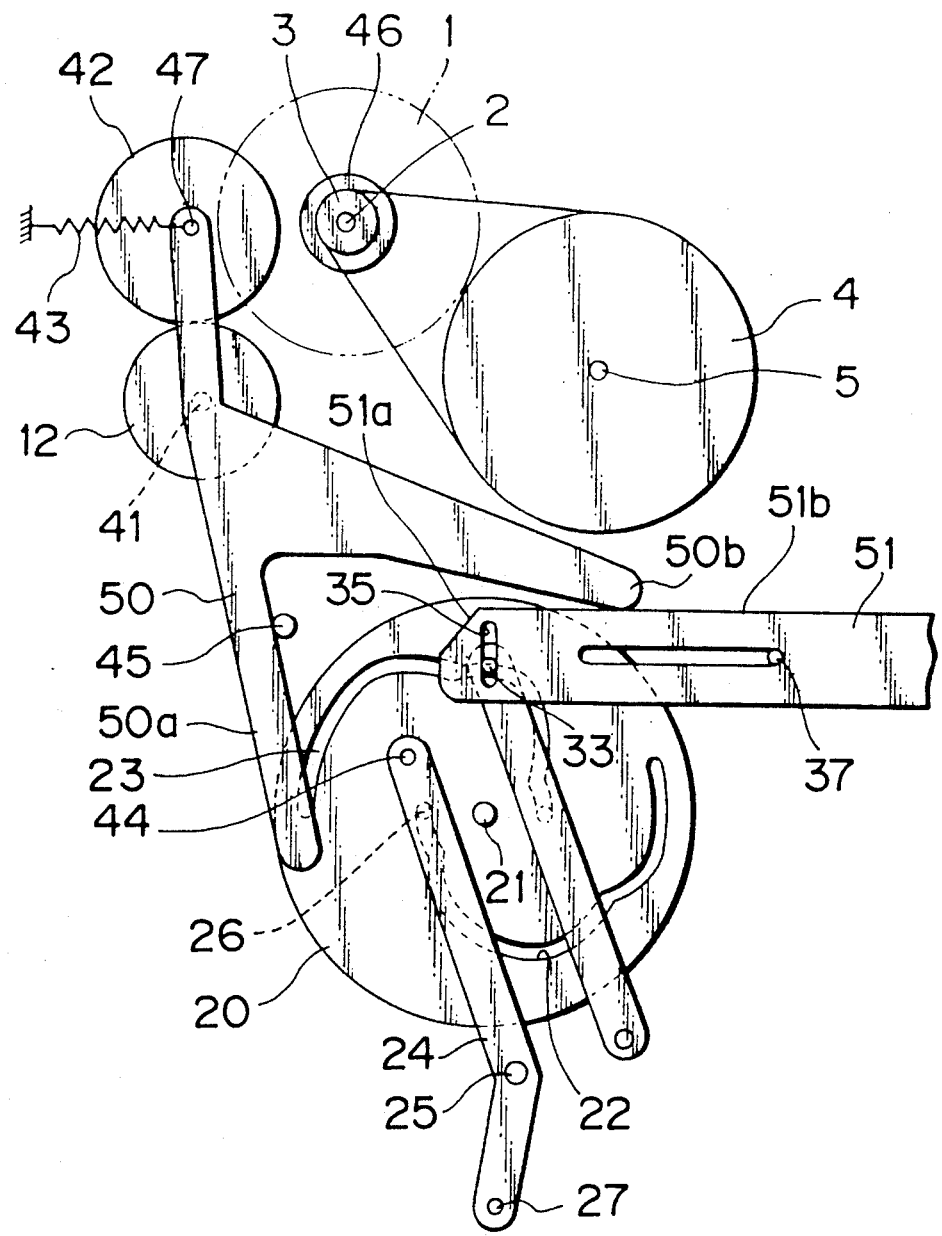
FIG. 5 is a similar view but showing the mechanism of FIG. 4 in a different position.

Referring now to FIGS. 4 and 5, there is shown part of a mechanism of another digital audio tape recorder to which the present invention is applied. The digital audio tape recorder mechanism of the present embodiment is a modification to the digital audio tape recorder mechanism of the preceding embodiment shown in FIGS. 1 to 3, and description of such common construction is omitted herein to avoid redundancy.

The digital audio tape recorder mechanism of the present embodiment includes a modified third lever 50 in place of the third lever 40 in the digital audio tape recorder mechanism of the preceding embodiment. The modified third lever 50 is bifurcated at an arm thereof into a pair of branches including a first branch 50 for contacting with the stopper pin 45 and also with the contacting pin 44 on the first lever 24 and a second branch 50b for contacting with a side end face of a modified movable plate 51 which corresponds to the movable plate 34 of the preceding embodiment. The second branch 50b extends to a location near and opposing to a corner of the movable plate 51 at which the movable plate 51 is cut obliquely to form a tapered or inclined portion 51a.

In the magnetic tape device, after a tape cassette not shown is set in position by rotation of the output gear 12 which is rotated by the capstan motor 1 as described hereinabove, the cam gear 20 is rotated in the counterclockwise direction indicated by an arrow mark A in FIG. 4 by rotation of the drive motor (not shown) so that the first and second levers 24 and 30 are pivoted in the clockwise and counterclockwise directions in FIG. 4 around the first and second support shafts 25 and 31, respectively.

Upon counterclockwise pivotal motion of the second lever 30, the movable plate 51 is moved in the leftward direction indicated by the arrow mark B in FIG. 4 as described hereinabove. Upon such leftward movement of the movable plate 51, the inclined portion 51a thereof is engaged with an end of the second branch 50b of the third lever 50 to pivot the third lever 50 compulsorily in the counterclockwise direction around the third support shaft 41 in addition to the urging force of the spring 43. Thereupon, the moving gear 42 is brought out of meshing engagement with the motor gear 46 as seen in FIG. 5. As the leftward movement in FIG. 4 of the movable plate 51 continues further, the end of the second branch 50b of the third lever 50 slides on a side edge 51b of the movable plate 51 contiguous to the inclined portion 51a and thus retains the third lever 50 in the counterclockwise pivoted position shown in FIG. 5.

Thus, even if a pivoting force should act in the clockwise direction in FIG. 5 upon the third lever 50 by some reasons while the movable plate 51 is being moved in the leftward direction in FIG. 5 and hence the magnetic tape is being drawn out from within the tape cassette not shown, the end of the second branch 50b of the third lever 50 contacts with the side edge 51b of the movable plate 51 to inhibit such pivotal motion of the third lever 50 in the clockwise direction. Accordingly, the moving gear 42 will not be brought into meshing engagement with the motor gear 46 at all. If the moving gear 42 is otherwise engaged with the motor gear 46, then an operation of loading a tape cassette which is performed by the cassette loading mechanism connected to the output gear 12 and another operation of drawing out a magnetic tape from the cassette which is performed by the tape loading mechanism connected to the cam gear 20 are carried out simultaneously and the two mechanisms may cause jamming with each other or may cause damage to a magnetic tape of the tape cassette. Such possible failure is prevented effectively with the digital audio tape recorder of the present embodiment.

Figure 6:
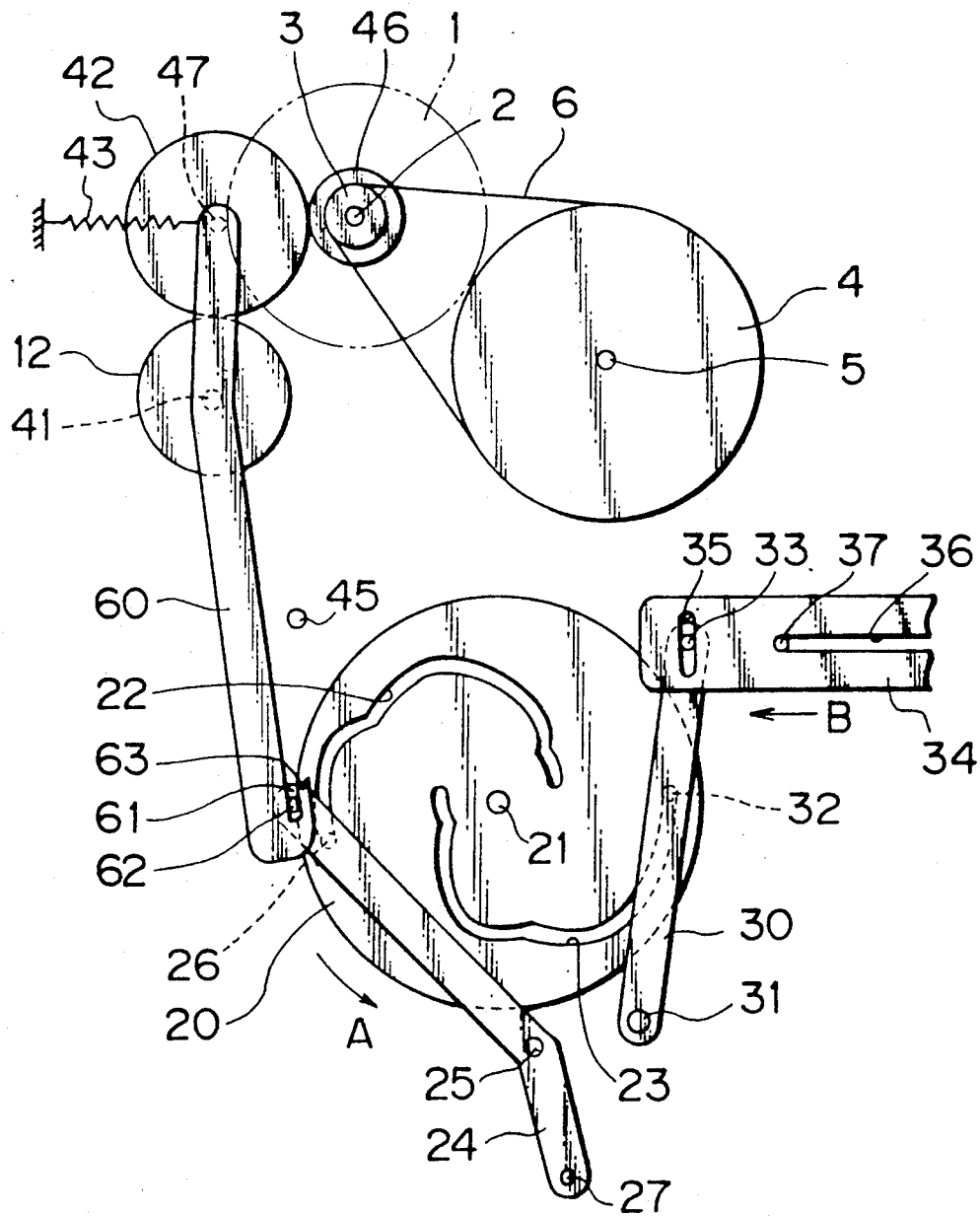
FIG. 6 is a bottom plan view of part of a mechanism of a digital audio tape recorder showing a third preferred embodiment of the present invention.
Figure 7:
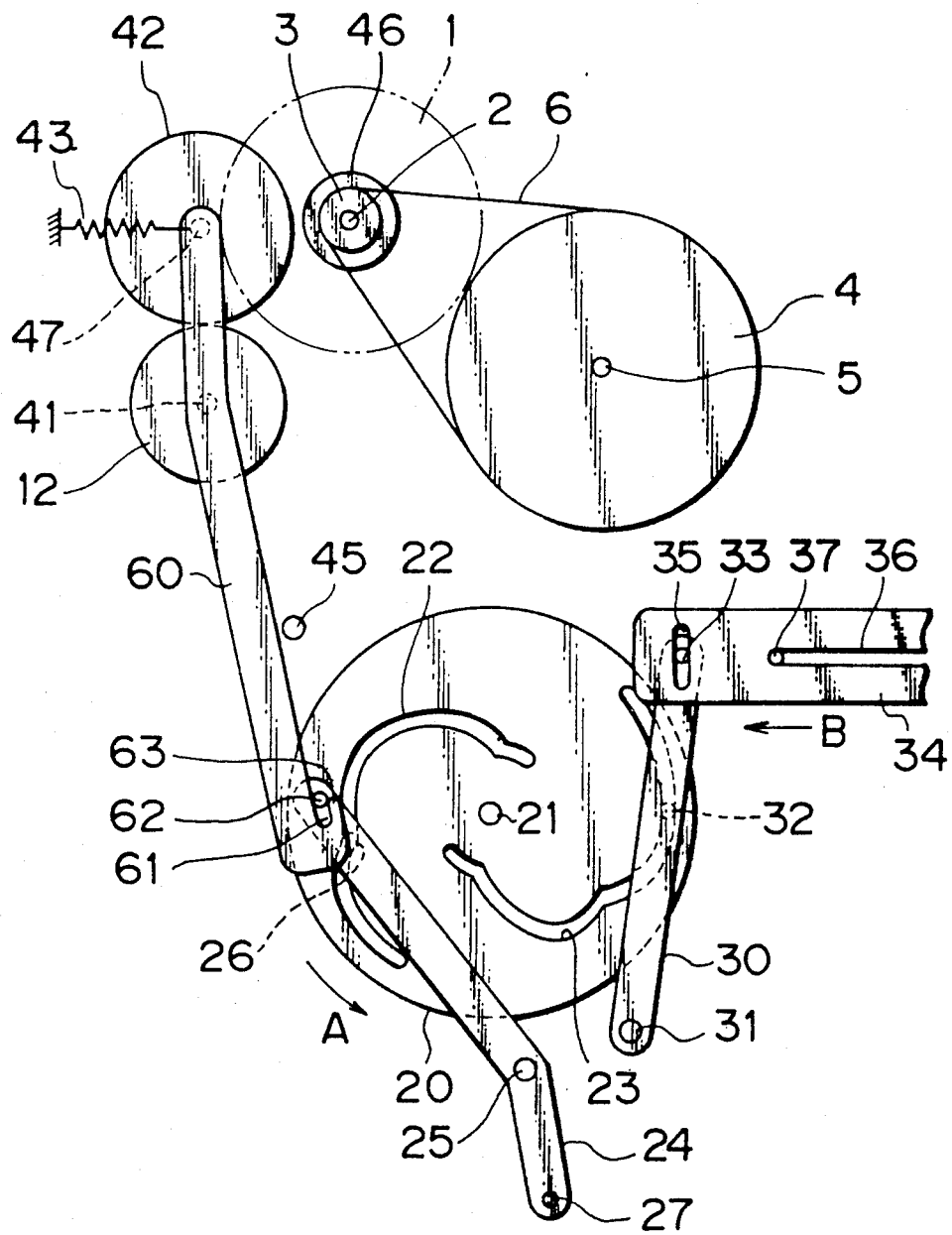
FIG. 7 is a similar view but showing the mechanism of FIG. 6 in a different position.
Figure 8:
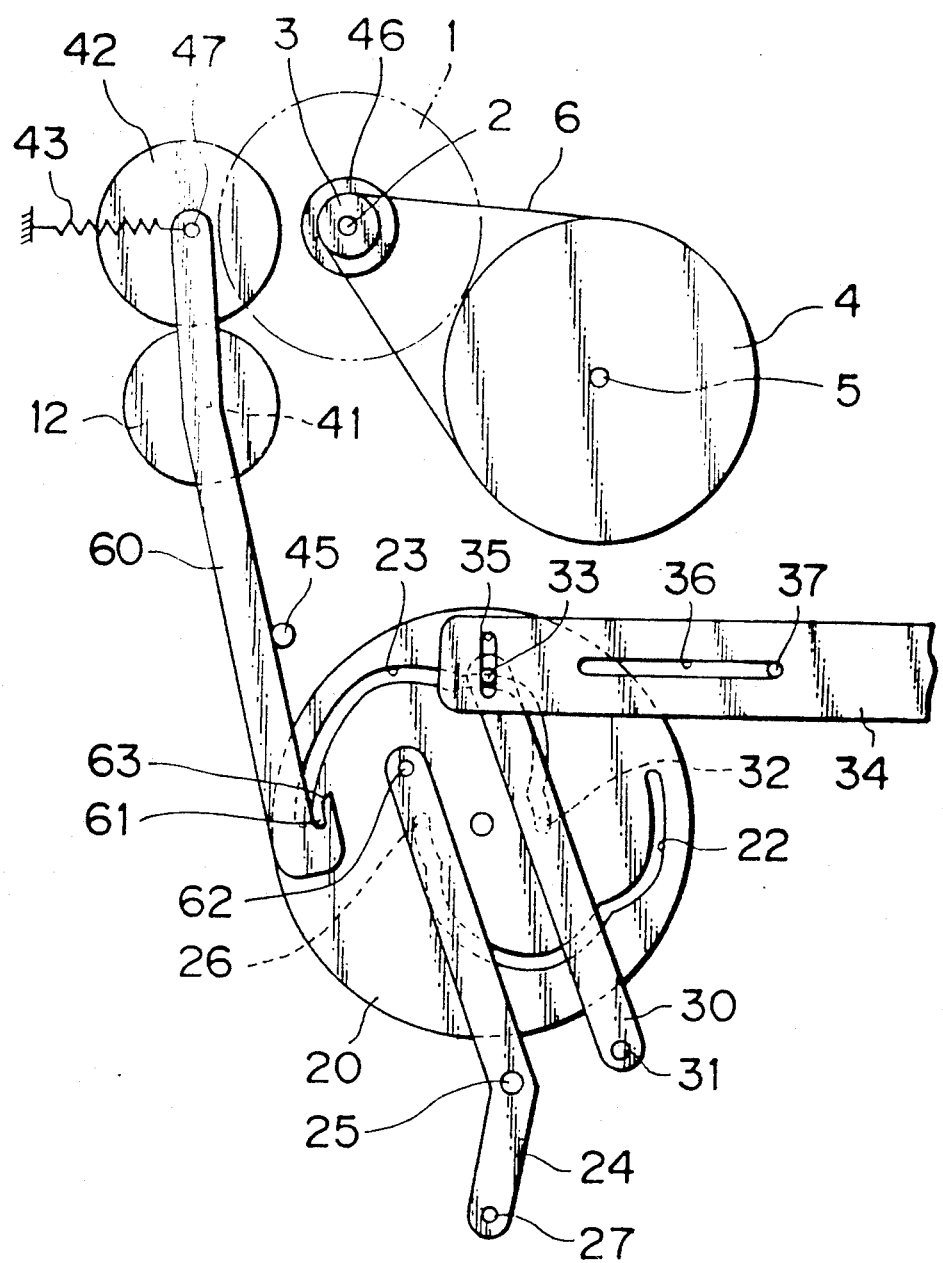
FIG. 8 is a similar view but showing the mechanism of FIG. 6 in another different position.

Referring now to FIGS. 6 to 8, there is shown part of a mechanism of a further digital audio tape recorder to which the present invention is applied. The digital audio tape recorder mechanism of the present embodiment is another modification to the digital audio tape recorder mechanism of the first embodiment shown in FIGS. 1 to 3, and description of such common construction is omitted herein to avoid redundancy.

The digital audio tape recorder mechanism of the present embodiment includes another modified third lever 60 in place of the third lever 40 or the modified third lever 50 in the digital audio tape recorder mechanism of the first or second embodiment. The modified third lever 60 has a hooked portion 63 formed at an end portion thereof remote from the post 47 so as to define a releasing groove 61 between the end portion and the hooked portion 63. A third engaging pin 62 is mounted at an end portion of the first lever 24 remote from the first engaging pin 27 farther than the first pin 26 and normally fitted in the releasing groove 61.

In the magnetic tape device, after a tape cassette not shown is set in position by rotation of the output gear 12 which is rotated by the capstan motor 1 as described hereinabove, the cam gear 20 is rotated in the counterclockwise direction indicated by an arrow mark A in FIG. 6 by rotation of the drive motor (not shown) so that the first and second levers 24 and 30 are pivoted in the clockwise and counterclockwise directions in FIG. 6 around the first and second support shafts 25 and 31, respectively.

Upon such clockwise pivotal motion of the first lever 24, since the third engaging pin 62 thereon is held fitted in the releasing groove 61 of the third lever 60, the third lever 60 is compulsorily pivoted in the counterclockwise direction in FIG. 6 around the third support shaft 41 by a pivoting force of the first lever 24 together with the urging force of the spring 43 to bring the moving gear 42 thereon out of meshing engagement with the motor gear 46. Before the third lever 60 is contacted with the stopper pin 45, the third engaging pin 62 is displaced completely from the releasing groove 61 of the third lever 60 as seen in FIG. 7, and after then, the first lever 24 is pivoted further in the clockwise direction upon further rotation of the cam gear 20 in the direction of the arrow mark A.

It is to be noted that, while in the present embodiment the releasing groove 61 is formed on the third lever 60 and the third engaging pin 62 is mounted on the first lever 24, the releasing groove 61 may otherwise be formed on the first lever 24 with the the engaging pin 62 mounted on the third lever 60.

Thus, with the digital audio tape recorder of the present embodiment, while the tape loading mechanism is being operated by way of the movable plate 34 to draw out a magnetic tape from within a tape cassette loaded in position in the digital audio tape recorder, the third lever 60 is compulsorily pivoted in the counterclockwise direction in FIG. 6 by the cam gear 20 by way of the first lever 24, and accordingly, the moving gear 42 will not be engaged with the motor gear 46. In other words, an operation of moving a tape cassette and another operation of drawing out a magnetic tape from the cassette are not carried simultaneously at all. Consequently, such possible failure as may be caused by the two loading operations which are performed simultaneously as described hereinabove can be prevented effectively with the digital audio tape recorder of the present embodiment.

It is to be noted that, while the present invention is applied to a digital audio tape recorder in the embodiments described above, it can naturally be applied to any magnetic tape device other than such digital audio tape recorder.

Having now fully described the invention, it will be apparent to one of ordinary skill in the art that many changes and modifications can be made thereto without departing from the spirit and scope of the invention as set forth herein.

What is claimed is:

1. A magnetic tape device for loading a tape cassette and for feeding and loading the magnetic tape in the tape cassette toward a rotary drum, comprising:
   a capstan motor having a motor shaft operatively connected to a capstan;
   a motor gear mounted on said motor shaft of said capstan motor;
   a cam gear operatively connected to a drive motor so as to operate a tape loading mechanism for drawing out the magnetic tape from the tape cassette when the tape cassette is in a cassette playing position;
   a movably mounted moving gear for engaging said motor gear to transmit rotation of said motor shaft to a cassette loading mechanism for moving a tape cassette to the cassette playing position; and
   a first pivotal lever rotatably supported on a fixed axis and having said moving gear mounted for rotation thereon, said lever being operatively associated with said cam gear such that rotation of said first pivotal lever is is dependent upon the amount of rotation of said cam gear, whereby when said tape loading mechanism is in an inoperative position, said moving gear meshes with said motor gear to transmit rotation from said motor shaft to said cassette loading mechanism, and when said tape loading mechanism is moved to an operative position, said moving gear is brought out of meshing engagement with said motor gear.

2. A magnetic tape device as claimed in claim 1, further comprising an output gear rotatably supported on said fixed axis of said first pivotal lever and held in meshing engagement with said moving gear so that rotation of said moving gear is transmitted to said cassette loading mechanism by way of said output gear.

3. A magnetic tape device as claimed in claim 1, further comprising:
   a second pivotal lever pivotally supported on another fixed axis and normally held in operative connection with said cam gear; and
   engaging means for engaging said first pivotal lever with said second pivotal lever.

4. A magnetic tape device as claimed in claim 3, wherein said engaging means is a spring which urges said first pivotal lever to engage said second pivotal lever and also urges said moving gear to disengage from said motor gear.

5. A magnetic tape device as claimed in claim 3, wherein said engaging means is arranged so that said first pivotal lever is capable of being disengaged from said second pivotal lever when said second pivotal lever is pivoted by said cam gear until said tape loading mechanism is moved to the operative position.

6. A magnetic tape device as claimed in claim 5, wherein said engaging means comprises:
   a pin mounted on one of said first and second pivotal levers; and
   a hook formed on the other of said first and second pivotal levers, said hook defining a groove in which said pin is removably fitted.

7. A magnetic tape device as claimed in claim 1, further comprising means responsive to movement of said tape loading mechanism from the inoperative to the operative position for pivoting said first pivotal lever and disengaging said moving gear from said motor gear.

8. A magnetic tape device as claimed in claim 7, wherein said tape loading mechanism further comprises a plate moveable between an inoperative position and an operative position which correspond to the inoperative and operative positions of said tape loading mechanism, respectively, and wherein said pivotal lever further comprises an arm with an end arranged such that, when said movable plate is moved from the inoperative position to the operative position, said end of said arm is engaged by an inclined face of said movable plate so as to pivot said first pivotal lever and disengage said moving gear from said motor gear.

9. A magnetic tape device as claimed in claim 1, wherein said cam gear rotates and including a movable member operatively associated with said cam gear for moving in response to rotational movement of said cam gear, and biasing means for normally biasing said first pivotal lever to a position in which said moving gear is out of engagement with said motor gear, the operative association between said cam gear and said first pivotal lever including said first pivotal lever contacting said movable member when said tape loading mechanism is in the inoperative position so as to overcome the biasing force of the biasing means and thereby cause the first pivotal lever to pivot so that the moving gear engages the motor gear.

* * * * *